United States Patent
Hendel

(10) Patent No.: US 8,272,352 B2
(45) Date of Patent: Sep. 25, 2012

(54) APPARATUS AND METHOD FOR FEEDING CHICKS DURING THE HATCHING PROCESS

(75) Inventor: Eliezer Hendel, Kibbutz Lochamei Hagetaot (IL)

(73) Assignee: Milouot Corporation for the Development of Haifa Bay Settlements Ltd, D.N. Ashrat (IL)

( * ) Notice: Subject to any disclaimer, the term of this patent is extended or adjusted under 35 U.S.C. 154(b) by 269 days.

(21) Appl. No.: 12/281,989

(22) PCT Filed: Mar. 22, 2007

(86) PCT No.: PCT/IL2007/000372
§ 371 (c)(1),
(2), (4) Date: Sep. 7, 2008

(87) PCT Pub. No.: WO2007/110861
PCT Pub. Date: Oct. 4, 2007

(65) Prior Publication Data
US 2009/0199780 A1  Aug. 13, 2009

Related U.S. Application Data

(60) Provisional application No. 60/786,733, filed on Mar. 29, 2006.

(51) Int. Cl.
*A01K 41/00* (2006.01)

(52) U.S. Cl. .................................. 119/322; 119/311

(58) Field of Classification Search ............... 119/301, 119/302, 304, 305, 306, 307, 308, 309, 310, 119/311, 320, 321, 322, 323, 324, 325, 328, 119/454, 456, 61.1, 417, 452, 246
See application file for complete search history.

(56) References Cited

U.S. PATENT DOCUMENTS

| | | | |
|---|---|---|---|
| 508,808 A | 11/1893 | Bray | |
| 2,007,917 A | 4/1931 | McGrew | |
| 1,827,530 A * | 10/1931 | Le Grand | 600/21 |
| 2,114,460 A * | 4/1938 | Ziegler | 362/154 |
| 2,496,433 A * | 2/1950 | Bonham | 119/301 |
| 2,593,029 A * | 4/1952 | Holdredge | 119/304 |
| 2,628,590 A * | 2/1953 | Wood | 119/302 |
| 2,909,152 A | 9/1957 | Cordis | |
| 3,396,703 A * | 8/1968 | Trussell | 119/301 |
| 3,800,746 A | 4/1974 | Stidham | |
| 4,241,700 A * | 12/1980 | Cobb | 119/57.4 |
| 4,606,299 A | 8/1986 | Grumbach | |
| 2005/0284405 A1 * | 12/2005 | Pomakoy-Poole et al. | 119/497 |

FOREIGN PATENT DOCUMENTS

| | | |
|---|---|---|
| CN | 1799349 | 7/2006 |
| GB | 2298117 | 8/1996 |
| RU | 2102873 | 1/1998 |
| RU | 50421 | 1/2006 |
| SU | 217123 | 4/1968 |

* cited by examiner

*Primary Examiner* — Monica Williams
(74) *Attorney, Agent, or Firm* — Mark M. Friedman

(57) ABSTRACT

A method and a compartment within an incubator, capable of allowing chicks to feed during the hatching process without reducing hatchability or livability. Thanks to immediate post hatch nutrition, the development during the chicks first days is significantly improved, resulting in a significant improvement in their weight as well. Furthermore, the accessibility of feed for the chicks is enabled and improved immediately after their hatching thanks to suitable lighting and the use of feeding troughs with transparent walls.

18 Claims, 5 Drawing Sheets

APPARATUS AND METHOD FOR FEEDING CHICKS DURING THE HATCHING PROCESS

FIELD AND BACKGROUND OF THE INVENTION

The present invention relates to a method and a compartment within an incubator, capable of allowing chicks to feed during the hatching process without reducing hatchability or livability. According to the prior art, most chicks which hatch from eggs in an incubator are prevented from immediately reaching their feed because of the structure of the incubator which prevents movement of the chicks and because the incubator is dark. The incubator is darkened because lighting with standard lighting means could heat the eggs that have yet to hatch and cause them to hatch prematurely. According to the prior art, there is no feed or light at all in incubators, and chicks gain access to feed only when moved to farms.

Immediate post hatch nutrition improves development during the chicks first days as well as through marketing in part by increasing breast muscle. The major source of energy in the developing embryo is the yolk. Yolk is utilized in two pathways. During the earlier stages of embryonic development, yolk transport is via endocytosis directly into the circulation. Close to hatching, yolk is internalized into the abdominal cavity and is secreted through the yolk stalk into the small intestine. These two processes function close to and after hatch. Yolk that is transported through the yolk stalk enters the distal portion of the small intestine and is then pushed by anti-peristaltic movements up towards the proximal section of the Gastro Intestinal Tract (GIT) reaching the stomach where digestion begins. Yolk that goes directly into the distal portion of the small intestine is not hydrolyzed and is excreted. During this time the chick must transfer from yolk dependence to utilization of exogenous feed. Intake of nutrients immediately post hatch stimulates transport of yolk through the yolk stalk into the intestine and intestinal growth. According to commercial practice chicks are fed only after 48-72 hours post hatch. Yolk, therefore, provides energy for the developing embryo/chick, small intestinal growth, and if feed is introduced close to hatch then it stimulates yolk transport to the GIT and its utilization. During the initial post hatch period there is preferential growth of the small intestine as compared to other internal organs especially in chicks with immediate access to feed and water. Studies indicated that early availability of feed results in more rapid intestinal development in the immediate post hatch period. The growth advantage in early fed birds after yolk assimilation is maintained through market age.

In commercial practice eggs within a single tray will hatch over a 24-36 hour window during which time the birds which have piped are without feed. Incubatory treatments and transport to the farm involve a further holding period. Thus, birds are held for 48-72 hours before initial access to feed and water. During this time chicks decrease in weight at an approximate rate of 4 grams per 24 hours due in part to moisture loss as well as yolk utilization. The process of incubation is 21 days, and at present broiler grow-out period is approximately 42-43 days, therefore each day of development plays a major role in final performance outcome. Providing feed within the incubator stimulates gastrointestinal development thus improving digestion and absorption of nutrients and decreasing the acclimation period from yolk dependence to exogenous feed. Caloric nutrients produce a considerable increase in body weight (BW) which was maximal between 4-8 days and then decreased. At marketing, birds with early access to nutrients were 5-8% heavier then held birds. Percentage of breast muscle was increased by 7-9% in fed birds.

Chicks receiving immediate access to feed post hatch are not held for a prolonged period of time and thus have a welfare advantage to the majority of poultry which wait for up to 48 hours prior to initial feeding.

There is thus a widely recognized need for, and it would be highly advantageous to have, apparatus and method for feeding chicks of various poultry, such as chickens, turkeys, geese, and ducks, during the hatching process, without changing their hatching times.

SUMMARY OF THE INVENTION

According to the present invention, a method and a compartment within an incubator, capable of allowing chicks to feed during hatching process without reducing hatchability or livability, is provided. A preliminary trial using a small scale feeding and lighting compartment resulted in improvement of body weight immediately post-hatch and through marketing.

According to the present invention there is provided a compartment within an incubator, enabling chicks to feed during hatching without reducing hatchability or livability, the compartment including: (a) an incubator egg tray, having an egg tray bottom, and at least one egg tray wall; and (b) at least one trough, having a trough bottom, and at least one transparent trough wall, disposed inside the incubator egg tray.

According to still further features in the described preferred embodiments of the compartment within the incubator the trough is a side trough, having a side trough back.

According to still further features in the described preferred embodiments the compartment within the incubator, further including: (c) a lighting source disposed above the egg tray bottom.

According to still further features in the described preferred embodiments of the compartment within the incubator, at least one of the side troughs is disposed on the egg tray wall.

According to still further features in the described preferred embodiments of the compartment within the incubator, the lighting source includes: (i) a central UV source; and (ii) a reflector disposed above the central UV source.

According to still further features in the described preferred embodiments of the compartment within the incubator, the lighting source includes: (i) at least two light emitting diodes dispersed within the compartment.

According to still further features in the described preferred embodiments, the compartment within the incubator further includes: (d) phosphoric coatings disposed on the side trough back; and wherein the lighting source is a weak light source.

According to still further features in the described preferred embodiments, the compartment within the incubator further including: (c) a lighting source disposed inside said egg tray bottom, wherein the lighting source emits substantially no heat that may heat eggs within the incubator egg tray prior to hatching.

According to still further features in the described preferred embodiments of the compartment within the incubator, the trough is a main trough having a canal with a closed loop shape.

According to still further features in the described preferred embodiments of the compartment within the incubator, the trough is an integral part of the incubator egg tray structure.

According to still further features in the described preferred embodiments of the compartment within the incubator, the trough is not an integral part of the incubator egg tray structure.

According to still further features in the described preferred embodiments, the compartment within the incubator further includes: (c) at least one secondary trough disposed inside the incubator egg tray, having a bottom, and at least one transparent wall.

According to still further features in the described preferred embodiments of the compartment within the incubator, the lighting source includes: (i) a central UV source; and (ii) a reflector disposed above the central UV source.

According to still further features in the described preferred embodiments of the compartment within the incubator, the lighting source includes: (i) at least two light emitting diodes dispersed within the compartment.

According to still further features in the described preferred embodiments the compartment within the incubator further includes: (d) phosphoric coatings disposed on the side trough back; and wherein the lighting source is a weak light source.

According to the present invention there is provided an incubator including: (a) a compartment, enabling chicks to feed during hatching without reducing hatchability or livability, the compartment including: (i) an incubator egg tray, having an egg tray bottom, and at least one egg tray wall; and (ii) at least one trough, having a trough bottom, and at least one transparent trough wall, disposed inside the incubator egg tray; and (iii) a lighting source disposed above the egg tray bottom; and (b) an automated feeder, wherein the automated feeder enables automatic distribution of feed to the at least one trough.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
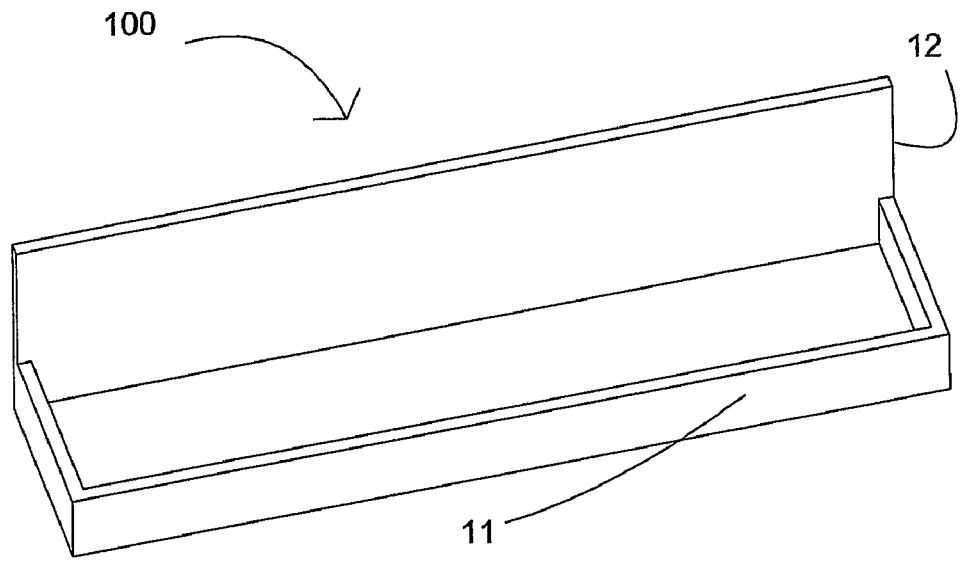
FIG. 1 is a schematic illustration of an isometric view of a side trough.

Unless otherwise defined, all technical and scientific terms used herein have the same meaning as commonly understood by one of ordinary skill in the art to which this invention belongs. The materials, dimensions, methods, and examples provided herein are illustrative only and are not intended to be limiting.

The invention is herein described, by way of example only, with reference to the accompanying drawings. With specific reference now to the drawing in detail, it is stressed that the particulars shown are by way of example and for purposes of illustrative discussion of the preferred embodiment of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawing, like-referenced characters are used to designate like elements.

The following list is a legend of the numbering of the application illustrations:

| | |
|---|---|
| 100 | side trough (a feeder) |
| 101 | main trough |
| 102 | secondary trough |
| 200 | incubator egg tray (a hatching tray) |
| 300 | compartment within an incubator |
| 400 | automated feeder |
| 11 | transparent trough wall |
| 12 | back of the trough |
| 13 | LEDs |
| 14 | UV source |
| 15 | reflector |
| 16 | a weak light source |
| 17 | phosphoric coatings |
| 19 | feeding canal |
| 20 | feed |
| 21 | bottom of egg tray |
| 22 | egg tray wall |
| 30 | feed storage container |
| 31 | feed portion dispenser |
| 32 | funnel |
| 33a | first sensor |
| 33b | second sensor |
| 33c | third sensor |

Referring now to the drawings, FIG. 1 is a schematic illustration of an isometric view of a side trough 100, serving as a feeder, according to the present invention. The illustration shows a long shallow rectangle receptacle, transparent trough wall 11, capable of containing feed which is fitted along the sides of the egg trays within the incubator (not shown in the illustration), and the back of the trough 12.

Figure 2:
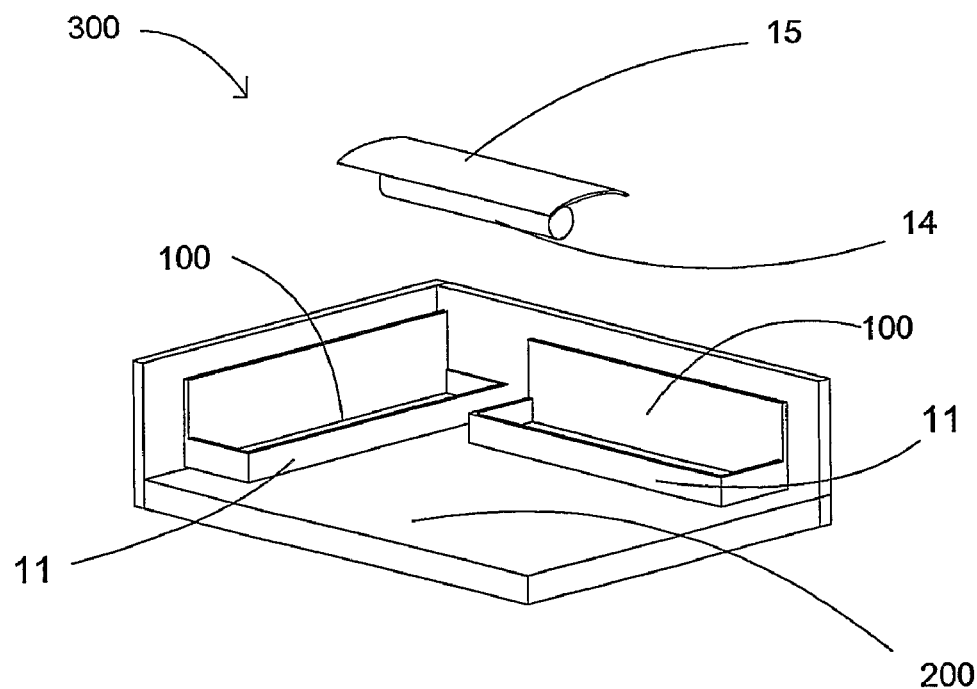
FIG. 2 is a schematic illustration of an isometric view of an incubator egg tray including side troughs and a UV source, according to the present invention.

FIG. 2 is a schematic illustration of an isometric view of an incubator egg tray 200, according to the present invention, to the sides of which two side troughs 100 are attached.

According to the present invention, one side trough 100 or more, for example four, can be disposed within the incubator egg tray 200, attached to its sides or in any other suitable place.

Trough walls 11 can be built as separate troughs, for example along the sides of egg tray 200, as illustrated in the figure, or can be built as an integral part of egg tray 200.

An incubator can contain one egg tray 200, or a larger amount, for example several groups of egg trays 200 disposed one next to the other, with each group including several egg trays, for example fifteen, disposed one above the other.

A central UV source 14 and reflector 15 are disposed in a suitable place in the incubator according to the present invention, in order to supply light to hatching chicks without heating eggs prior to hatch.

Egg tray 200, side troughs 100, central UV source 14 and reflector 15 are part of a compartment within incubator 300.

Figure 3:
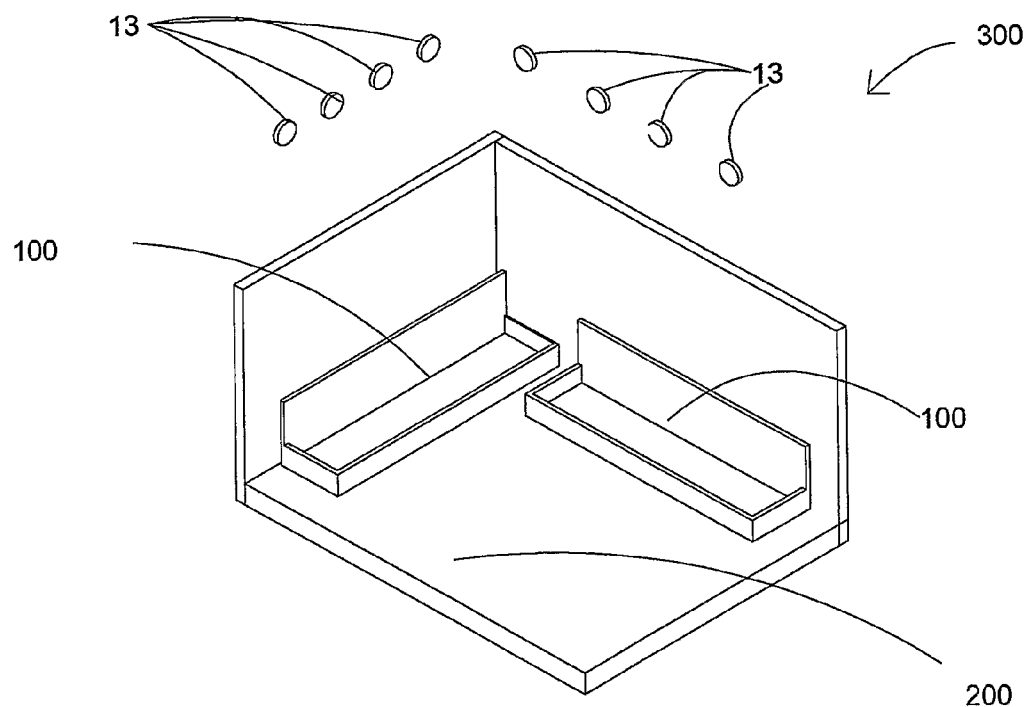
FIG. 3 is a schematic illustration of an isometric view of an incubator egg tray, including two side troughs and LED light sources, according to the present invention.

FIG. 3 is a schematic illustration of an isometric view of an incubator egg tray 200, according to the present invention. This illustration demonstrates light sources, including LEDs 13 which can be dispersed within the incubator, in order to provide light to hatching chicks without heating eggs prior to hatch.

Figure 4:
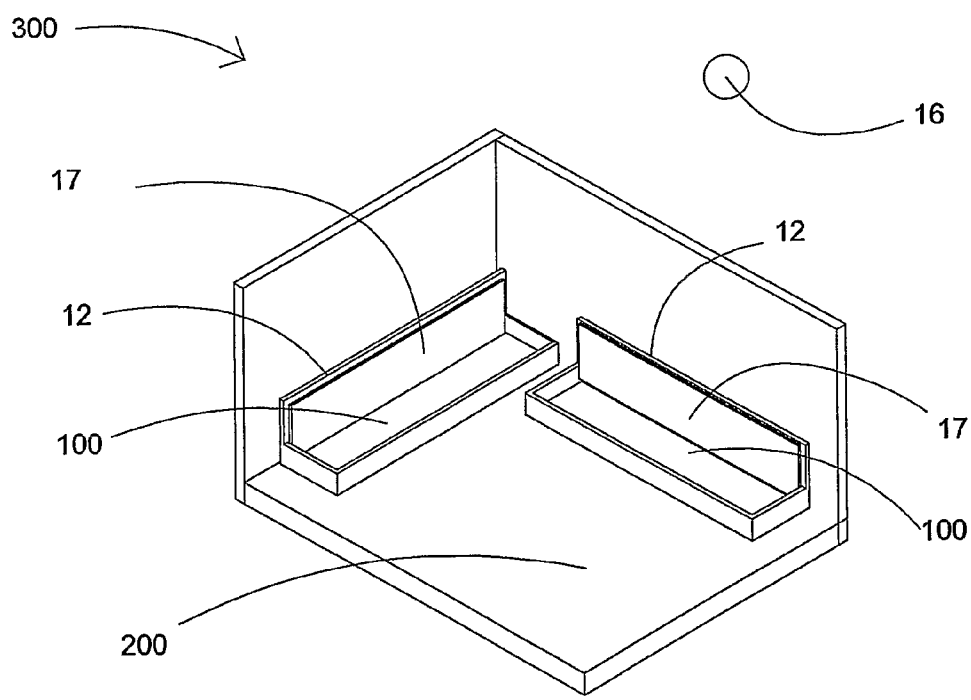
FIG. 4 is a schematic illustration of an isometric view of an incubator egg tray, including two side troughs, a weak light source disposed within the incubator, and phosphoric coatings, according to the present invention.

FIG. 4 is a schematic illustration of an isometric view of an incubator egg tray 200, according to the present invention. This illustration shows a weak light source 16 disposed within the incubator and phosphoric coatings 17 on the back of the trough 12, whose addition provides light to hatching chicks without heating eggs prior to hatch.

As used herein the specifications and claims, the term weak light refers to light that is strong enough for chicks to be able to find the feed, however not strong enough to agitate them.

Figure 5:
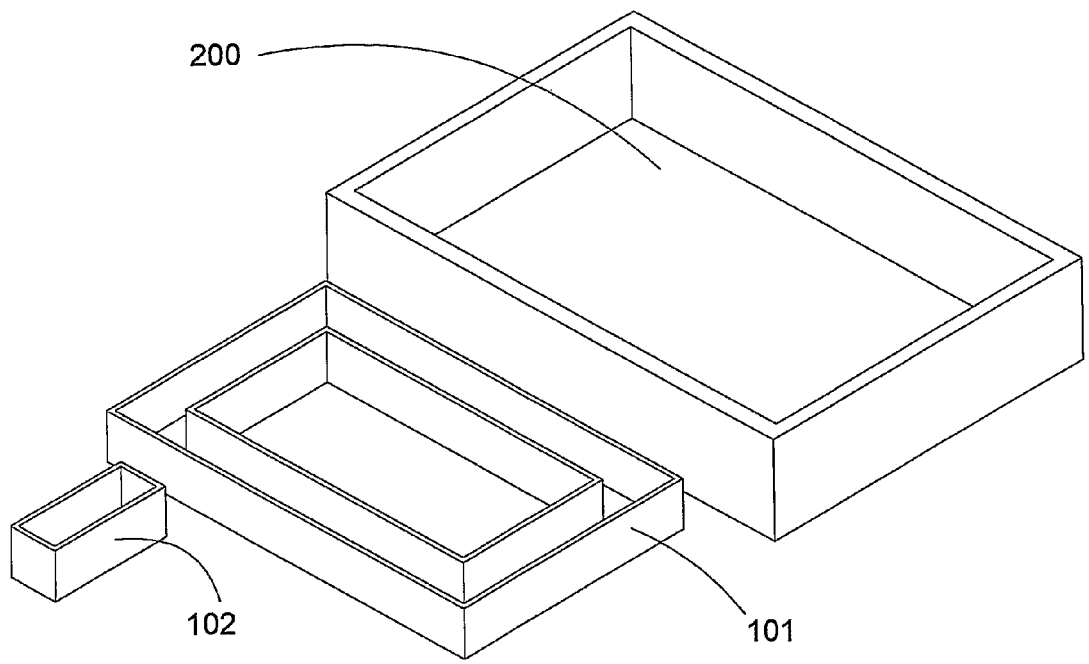
FIG. 5 is a schematic illustration of an isometric view of an egg tray, a main trough, and a secondary trough, disposed side by side.

FIG. 5 is a schematic illustration of an isometric view of an egg tray 200, a main trough 101, and a secondary trough 102, disposed side by side. Main trough 101 and a secondary trough 102, as shown in the illustration, are separate units which can be disposed within egg tray 200, and be removed for the purpose of cleaning between incubations, to maintain hygiene of egg tray 200 or for any other purpose. The shape of main trough 101 can be as shown in the illustration, namely a long canal in the form of four sides of a rectangle, or any other suitable shape. The shape of secondary trough 102 can be as shown in the illustration, namely a linear canal, or any other suitable shape. For lighting purposes, the walls of the main trough 101 and the secondary trough 102 can be transparent to a sufficient extent for the wavelengths used for lighting. The structure materials can be plastic, composite, or other suitable materials.

Note the difference in that main trough 101 has a one piece structure, surrounding four sides of hatching egg tray 200, or at a certain distance from them instead of individual pieces, such as two, or four or other number of side troughs 100, placed in egg tray 200, as shown in FIGS. 2, 3, and 4.

Figure 6:
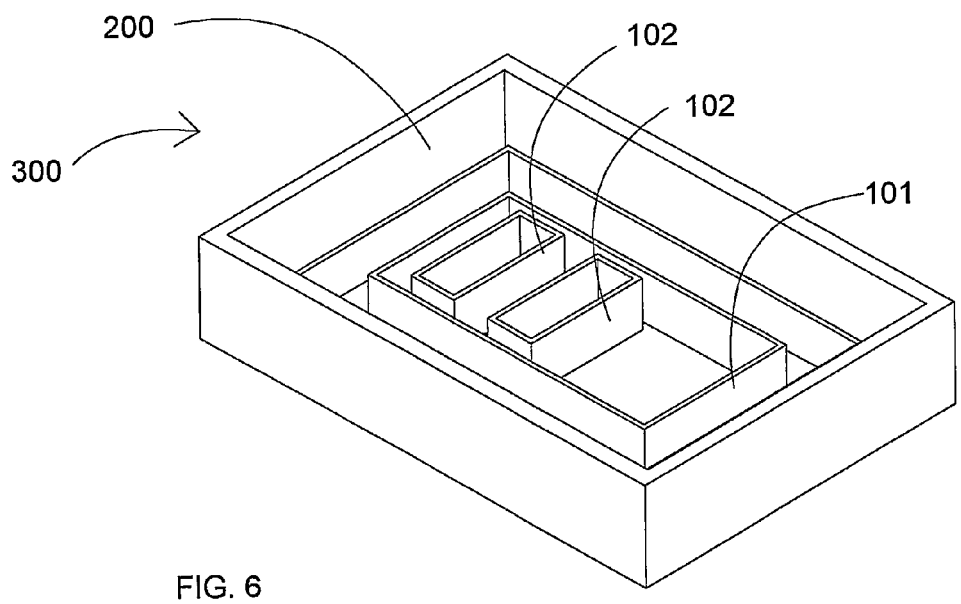
FIG. 6 is a schematic illustration of an isometric view of an egg tray, a main trough, and two secondary troughs, disposed side by side and which are removable, according to the present invention.

FIG. 6 is a schematic illustration of an isometric view of an egg tray 200, a main trough 101, and two secondary trough 102, which are disposed one inside the other and are removable, according to the present invention. The location and quantity of main troughs 101, and secondary troughs 102 can vary and is chosen and determined by need and according to requirements such as space conservation for the purpose of clearing space for the chicks, or alternatively better access to feed for the chicks. An example of a selected configuration is the location of one rectangular main trough 101 within egg tray 200 with smaller dimensions than those of egg tray 200 and at a considerable distance from the walls of egg tray 200 such that the chicks have access to its canals from all sides. Furthermore, several secondary troughs 102 are disposed within the internal rectangle formed by the canals of the egg tray 200. These secondary troughs 102 have small geometrical dimensions from a top view relative to egg tray 200, and enable improved access to feed for the chicks. Note that the quantity of secondary troughs 102 can also be selected by need, and can be none, one, or more.

Figure 7:
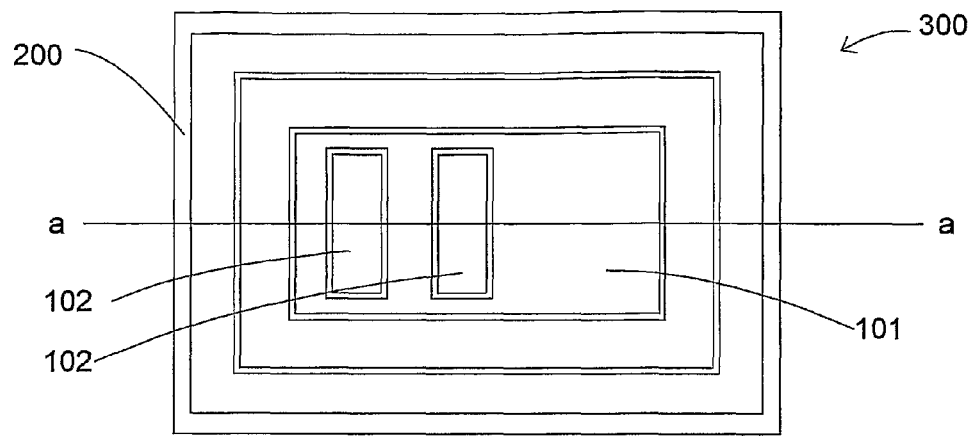
FIG. 7 is a schematic illustration of a top view of an egg tray, a main trough, and two secondary troughs, disposed one within the other, according to the present invention.

FIG. 7 is a schematic illustration of a top view of an egg tray 200, a main trough 101, and two secondary troughs 102, disposed one within the other, according to the present invention. The illustration shows a lateral section line marked a-a.

Figure 8:
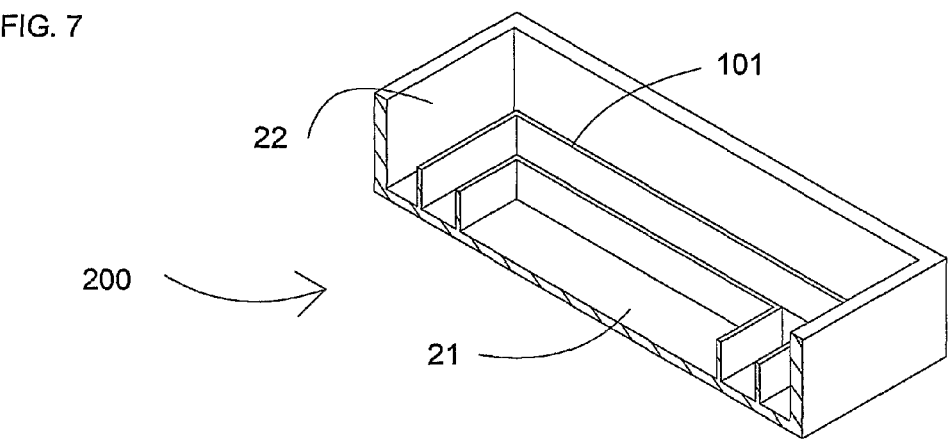
FIG. 8 is a schematic illustration of an isometric view of a lateral cross section of an egg tray equipped with an integral main trough, according to the present invention.

FIG. 8 is a schematic illustration of an isometric view of a lateral section a-a of an egg tray 200, equipped with an integral main trough 101, according to the present invention. In this case, main trough 101 is built directly into egg tray 200 as one continuous piece. Egg tray 200 has a bottom 21 with a geometrical shape which can, for example, be rectangular, or with a curved external contour line, and walls 22.

Figure 9:
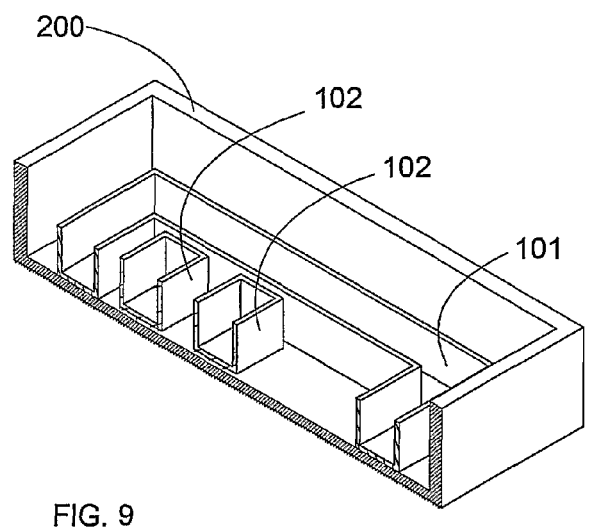
FIG. 9 is a schematic illustration of an isometric view of a lateral cross section of an egg tray, a removable main trough, and two removable secondary troughs, according to the present invention.

FIG. 9 is a schematic illustration of an isometric view of lateral section a-a of an egg tray 200, a removable main trough 101, and two removable secondary troughs 102, according to the present invention.

Figure 10:
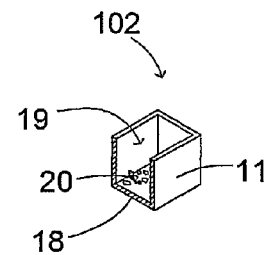
FIG. 10 is a schematic illustration of an isometric view of a lateral cross section of a secondary trough containing feed, according to the present invention.

FIG. 10 is a schematic illustration of an isometric view of lateral section a-a of secondary trough 102 containing feed 20, according to the present invention. This illustration shows one possible typical structure of secondary trough 102 which is also suited to the structure of main trough 101 and including transparent trough walls 11, and the bottom of the trough 18, which form feeding canal 19 in which feed 20 can be placed.

The lighting solutions described above can be adapted to every possible configuration including the above combinations of each egg tray and each trough, as well as others described in this patent application and all others in the gist of the present invention.

Figure 11:
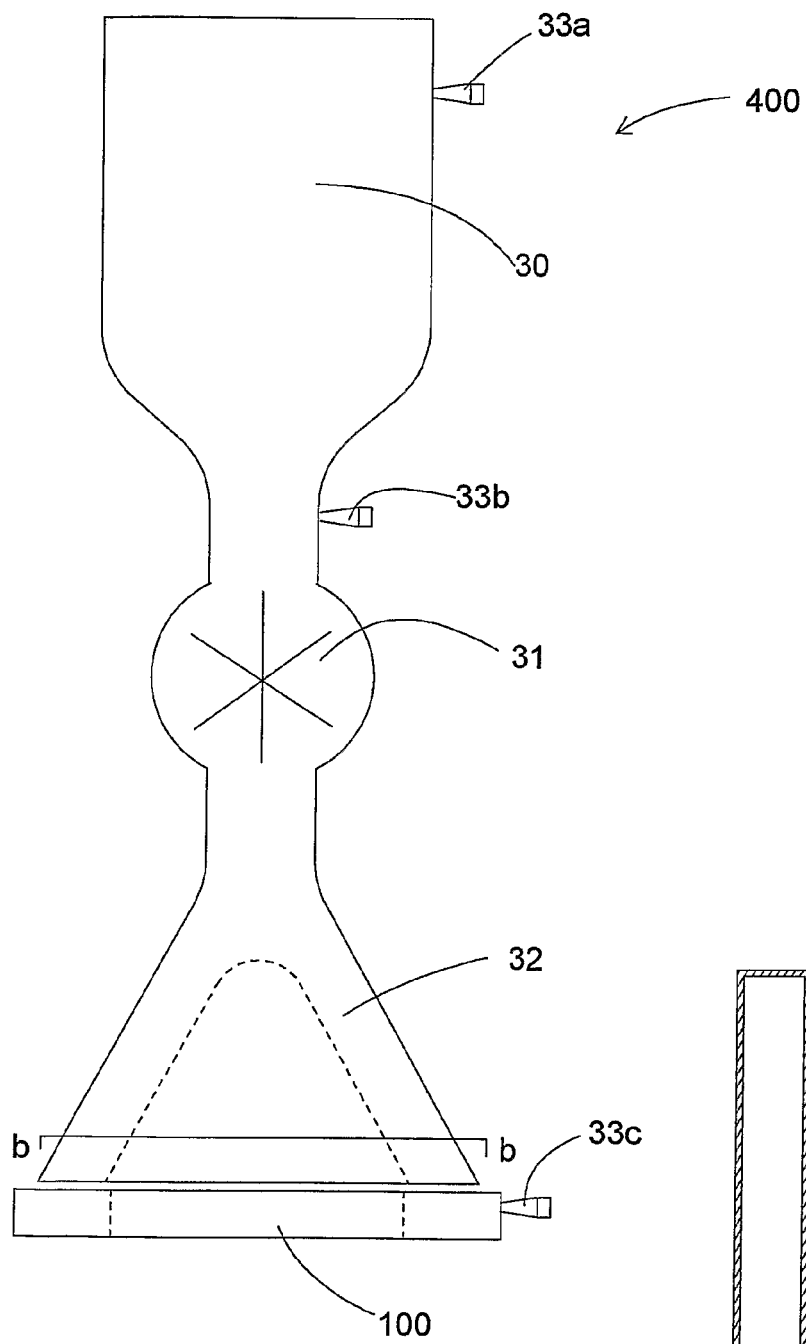
FIG. 11 is a schematic illustration of a side view of an automated feeder and a side trough, according to the present invention.

FIG. 11 is a schematic illustration of a side view of an automated feeder 400, and a side trough 100, according to the present invention. According to the present invention, feed can be distributed automatically to troughs in order to make feeding more convenient and less timely in comparison with manual feeding.

Automated feeder 400 can also include feed storage container 30 in its upper part, funnel 32 in its lower part, and feed portion dispenser 31 in between. Furthermore, the illustration also shows three sensors, first sensor 33a, disposed at a suitable level on the wall of the feed storage container 30 for controlling the quantity of feed in the container, second sensor 33b for controlling the quantity of feed filled into each trough, and a third sensor 33c disposed on one of the walls of side trough 100 for controlling the quantity of feed in the side trough 100 and controlling the position of funnel 32 above it.

In an incubator which contains more than one level of compartments, the compartments, including the egg trays and the troughs, can be pulled out like a shelf and disposed beneath funnel 32 for filling the troughs with feed.

The automated feeder can also include an electrical power source, electrical motors, and a control system, not shown in the illustration.

The illustration shows a lateral section line marked b-b.

Figure 12:
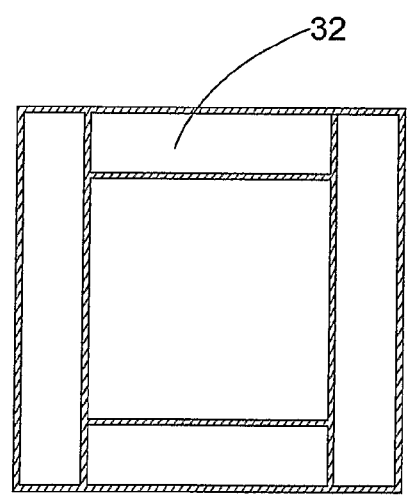
FIG. 12 is a schematic illustration of a lateral cross section in the automated feeder, according to the present invention.

FIG. 12 is a schematic illustration of a lateral cross section b-b in the funnel 32, of the automated feeder, according to the present invention. This section describes one of many possible embodiments, suitable in the specific case shown for filling feed into four side troughs 100, enabling filling each of the four troughs simultaneously or separately. Funnel 32 can be used in a similar manner with different section shapes, suitable for the position, shape, and dimensions of the relevant troughs.

Trials were performed to test the efficiency of using side trough 100 according to the present invention using an external light source. Specialized trays were installed into the incubator on day 18 of incubation. This enabled early hatching chicks' immediate access to feed.

The trial consisted of 4 treatments, which included fed and held birds as well as males and females. Prior to placement in experimental facility birds were individually weighed. Table 1 indicates body weight during trial.

TABLE 1

Effect of early feeding on weight from hatch through 36 days

| Sex | Treatment | Hatch wt | 10 d | 14 d | 21 d | 28 d | 36 d |
|---|---|---|---|---|---|---|---|
| Female | Control | 42.7 | 289.4 | 474.5 | 807.5 | 1278.9 | 1927.9 |
| Female | Feed | 43.1 | 284.0 | 477.2 | 820.5 | 1294.7 | 1980.6 |
| Male | Control | 41.1 | 276.9 | 485.6 | 866.7 | 1386.0 | 2261.6 |
| Male | Feed | 42.4 | 291.1 | 506.6 | 894.1 | 1474.1 | 2418.8 |

Results of this trial indicate a significant improved male body weight at 36 days in fed birds (6%) as compared to held birds. Females receiving immediate post hatch feed improved body weight at 36 days by 2.8% as compared to control.

Early feed has been shown in studies to improve immediate as well as further chick/broiler development. These broilers achieved improved body weight and carcass development at marketing improvements such as these increase industry profitability substantially.

An additional trial examined the efficacy of using 4 sided feeder trough with external light sources. Similar to trial 1 specialized trays were installed into the incubator on day 18 of incubation. This enabled early hatching chicks' immediate access to feed.

The trial consisted of 5 treatments, which included fed and held male birds with different external light sources. Prior to placement in experimental facility birds were individually weighed. Table 1 indicates body weight during trial.

TABLE 2

Effect of early feeding on weight from hatch through 37 days

| Treatment | Hatched [%] | Hatch wt.[Gr.] | Age [Days] Weight [Grams] | | | | |
|---|---|---|---|---|---|---|---|
| | | | 4 | 9 | 23 | 30 | 37 |
| Negative Control (no light) (no feed) | 94.8 | 38.4(a) | 73.2(c) | 181.7(bc) | 902.5(b) | 1355.3(bc) | 1783.4(c) |
| Positive Control (no light) (feed only) | 95.5 | 37.6(b) | 76.4(bc) | 183.9(b) | 931.7(b) | 1396.7(b) | 1887.5(ab) |
| White (light source) (feed) | 94.7 | 38.3(a) | 86.3(a) | 216.6(a) | 992.9(a) | 1463.8(a) | 1903.0(a) |
| UV (light source) (feed) | 95.5 | 37.3(b) | 70.7(c) | 181.1(c) | 900.7(bc) | 1373.4(bc) | 1817.5(bc) |
| Green (light source) (feed) | 94.3 | 73.3(b) | 76.6(b) | 191.4(b) | 887.8(c) | 1339.1(c) | 1759.2(c) |

Data were analyzed using general linear model of JMP 5.01 (SAS Institute, Inc). Treatment means were compared by Tukey test, and significance was based on 0.05 probability level. Means in column with no letters in common differ (P<0.05).

Means in the table's columns with different letters in parentheses differ statistically, i.e. those results with (a) within the same column are statistically different from those results with (ab) or (b) or (bc) or (c). In this case. (a) gave the best results while (c) showed significantly poorer performance.

Results of this trial indicate a significant improved body weight at 37 days in fed only birds (5.8%) as compared to negative control birds. Broilers receiving immediate post hatch feed with an external white light source had an improved body weight at 37 days by 6.7% as compared to negative control.

Our trials demonstrated that using this specialized feeding and lighting trays within the incubator, according to the present invention, provides easy feed access to hatched chicks, while not decreasing hatchability and livability. Immediate feed stimulates intestinal development and improves initial body weight which persists through to marketing.

A suitable light source according to the present invention would be any external non-heating light in a light spectrum that is visible to chicks.

The light source can be placed in several locations within the incubator, such as on the trough, on the incubator carriage, or somewhere within the incubator as long as the light attracts the chicks' attention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A compartment within an incubator, the incubator being an apparatus by which eggs are hatched artificially under controlled environmental conditions, the compartment enabling chicks to feed during hatching without reducing hatchability or livability, the compartment comprising:

(a) an incubator egg tray, having an egg tray bottom, and at least one egg tray wall, the incubator egg tray configured to hold eggs of chicks such that the eggs do not roll out of the incubator egg tray; and (b) at least one trough disposed inside said incubator egg tray, the at least one trough having a trough bottom, and at least one trough wall that is a back wall projecting upward from the trough bottom, the compartment configured to include both the at least one trough and the incubator egg tray so as to enable, in the same compartment within the incubator, (i) hatching of chicks and (ii) feeding of the chicks during hatching, the at least one trough holding feed suitable for newly hatched chicks;

a lighting source in the compartment, the lighting source configured to allow newly hatched chicks to see the feed in the at least one trough, yet the lighting source not emitting, when the lighting source is on, an amount of heat sufficient to heat eggs within said incubator egg tray prior to hatching, the incubator, including the compartment, not having a heating source configured, in terms of amount of heat emitted and in terms of location within the incubator, to heat any eggs in the incubator egg tray prior to hatching so as to cause premature hatching of said eggs, even under circumstances where there are eggs dispersed within said incubator egg tray, the incubator having controlled environmental conditions suitable for the eggs of the chicks prior to hatching and suitable for newly hatched chicks.

2. The compartment within an incubator according to claim 1, wherein said at least one trough is a side trough.

3. The compartment within an incubator according to claim 2, wherein at least one of said side troughs is disposed on said egg tray wall.

4. The compartment within an incubator according to claim 1, further comprising:
(c) the lighting source disposed above said egg tray bottom.

5. The compartment within an incubator according to claim 3, wherein said lighting source includes:
a central UV source; and
(ii) a reflector disposed above said central UV source.

6. The compartment within an incubator according to claim 3, wherein said lighting source includes:
at least two light emitting diodes dispersed within said compartment.

7. The compartment within an incubator according to claim 4, further comprising:
(d) phosphoric coatings disposed on said trough back wall; and wherein said lighting source is a weak light source.

8. The compartment within an incubator according to claim 1, further comprising:
(c) the lighting source disposed inside said egg tray bottom, wherein said lighting source emits substantially no heat that may heat eggs within said incubator egg tray prior to hatching.

9. The compartment within an incubator according to claim 1, further comprising the lighting source disposed above said egg tray bottom, wherein the at least one egg tray wall of the incubator egg tray comprises four egg tray walls, the egg tray walls not being movable, and wherein said trough is a main trough having a canal with a closed loop shape.

10. The compartment within an incubator according to claim 9, further comprising:
(c) at least one secondary trough disposed inside said incubator egg tray, having a bottom, and at least one wall.

11. The compartment within an incubator according to claim 9, wherein said lighting source includes:
(i) a central UV source; and
(ii) a reflector disposed above said central UV source.

12. The compartment within an incubator according to claim 9, wherein said lighting source includes:
(i) at least two light emitting diodes dispersed within said compartment.

13. The compartment within an incubator according to claim 9, further comprising:
phosphoric coatings disposed on said trough back wall; and wherein said lighting source is a weak light source.

14. The compartment within an incubator according to claim 1, wherein said trough is an integral part of said incubator egg tray structure.

15. The compartment within an incubator according to claim 1, wherein said trough is not an integral part of said incubator egg tray structure.

16. The compartment within an incubator according to claim 1, further comprising the at least one trough structured so that newly hatched chicks have access to a trough of the at least one trough from at least two sides.

17. An incubator, which is an apparatus by which eggs are hatched artificially under controlled environmental conditions, comprising:
(a) a compartment, enabling chicks to feed during hatching without reducing hatchability or livability, the compartment including:
(i) an incubator egg tray, having an egg tray bottom, and at least one egg tray wall, the incubator egg tray configured to hold eggs of chicks such that the eggs do not roll out of the incubator egg tray; and
(ii) at least one trough disposed inside said incubator egg tray, the at least one trough having a trough bottom, and at least one trough wall that is a back wall projecting upward from the trough bottom; and
(iii) a lighting source disposed above said egg tray bottom; and
(b) an automated feeder, wherein said automated feeder enables automatic distribution of feed to said at least one trough, the compartment configured to include both the at least one trough and the incubator egg tray so as to enable, in the same incubator compartment, (i) hatching of chicks and (ii) feeding of the chicks during hatching, the at least one trough holding feed suitable for newly hatched chicks, a lighting source in the compartment, the lighting source configured to allow newly hatched chicks to see the feed in the at least one trough, yet the lighting source not emitting, when the lighting source is on, an amount of heat sufficient to heat eggs within said incubator egg tray prior to hatching, the incubator not having a heating source configured, in terms of amount of heat emitted and in terms of location within the incubator, to heat any eggs in the incubator egg tray prior to hatching so as to cause premature hatching of said eggs, even under circumstances where there are eggs dispersed within said incubator egg tray, the incubator having controlled environmental conditions suitable for the eggs of the chicks prior to hatching.

18. An incubator including a compartment, the incubator being an apparatus by which eggs are hatched artificially under controlled environmental conditions, the compartment enabling chicks to feed during hatching without reducing hatchability or livability, the compartment comprising:
(a) an incubator egg tray, having an egg tray bottom, and at least one egg tray wall, the incubator egg tray configured to hold eggs of chicks such that the eggs do not roll out of the incubator egg tray; and
(b) at least one trough disposed inside said incubator egg tray, the at least one trough having a trough bottom, and at least one trough wall that is a back wall projecting upward from the trough bottom, the compartment configured to include both the at least one trough and the incubator egg tray so as to enable, in the same compartment within the incubator, (i) hatching of chicks and (ii) feeding of the chicks during hatching, the at least one trough holding feed suitable for newly hatched chicks;

a lighting source in the compartment, the lighting source configured to allow newly hatched chicks to see the feed in the at least one trough, yet the lighting source not emitting, when the lighting source is on, an amount of heat sufficient to heat eggs within said incubator egg tray prior to hatching, the incubator not having a heating source configured, in terms of amount of heat emitted and in terms of location within the incubator, to heat any eggs on the incubator egg tray prior to hatching so as to cause premature hatching of said eggs, even under circumstances where there are eggs dispersed within said incubator egg tray, the incubator having controlled environmental conditions suitable for the eggs of the chicks prior to hatching and suitable for newly hatched chicks.

\* \* \* \* \*

UNITED STATES PATENT AND TRADEMARK OFFICE
CERTIFICATE OF CORRECTION

| | | |
|---|---|---|
| PATENT NO. | : 8,272,352 B2 | Page 1 of 1 |
| APPLICATION NO. | : 12/281989 | |
| DATED | : September 25, 2012 | |
| INVENTOR(S) | : Eliezer Hendel | |

It is certified that error appears in the above-identified patent and that said Letters Patent is hereby corrected as shown below:

Claim 5, column 9

Line 34:
should be corrected as follows:
change:
-- a central UV source; and --
to
"(i) a central UV source; and"

Claim 6, column 9

Line 38:
should be corrected as follows:
change:
-- at least two light emitting diodes dispersed within said --
to
"(i) at least two light emitting diodes dispersed within said"

Signed and Sealed this
Fourth Day of December, 2012

David J. Kappos
*Director of the United States Patent and Trademark Office*